(12) United States Patent
Wang et al.

(10) Patent No.: US 10,866,648 B2
(45) Date of Patent: Dec. 15, 2020

(54) DISPLAY SUBSTRATE AND METHOD FOR MANUFACTURING THE SAME

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Chih Jen Cheng, Beijing (CN); Yanling Han, Beijing (CN); Yangbing Li, Beijing (CN); Xueyou Cao, Beijing (CN); Wei Liu, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 16/169,698

(22) Filed: Oct. 24, 2018

(65) Prior Publication Data
US 2019/0129510 A1    May 2, 2019

(30) Foreign Application Priority Data
Oct. 26, 2017   (CN) .......................... 2017 1 1013369

(51) Int. Cl.
*G06F 3/042*    (2006.01)
*G06F 3/01*    (2006.01)
*G06K 9/46*    (2006.01)
*G06K 9/00*    (2006.01)
*G06F 3/0488*    (2013.01)

(52) U.S. Cl.
CPC .............. *G06F 3/017* (2013.01); *G06F 3/042* (2013.01); *G06F 3/0421* (2013.01); *G06F 3/04883* (2013.01); *G06K 9/00355* (2013.01); *G06K 9/4647* (2013.01)

(58) Field of Classification Search
CPC ........ G06F 3/017; G06F 3/042; G06F 3/0421; G06F 3/04883; G06F 1/1637; G06F 1/1686; G06F 3/0304; G06F 1/1626; G06K 9/4647; G06K 9/00355; G06K 9/2018; G06K 9/00201; H01L 27/14683; H01L 27/14685; H01L 27/1469
See application file for complete search history.

(56) References Cited

U.S. PATENT DOCUMENTS

8,941,625 B2 *   1/2015  Dahl .................... G06F 3/017
                                                    345/177
9,530,381 B1 *  12/2016  Bozarth .............. G09G 3/3406
                        (Continued)

*Primary Examiner* — Jose R Soto Lopez
(74) *Attorney, Agent, or Firm* — Thomas | Horstemeyer LLP (57) ABSTRACT

The present disclosure relates to a display substrate. The display substrate includes an active region and a non-active region, and a depth camera is disposed in the non-active region. The depth camera includes at least one receiving unit and a plurality of diffractive units. At least a part of the diffractive units includes an infrared light emitting device disposed on the substrate that emits infrared light. The part of the diffractive units includes a diffractive optical element disposed on the infrared light emitting device and used to transmit the infrared light emitted from the infrared light emitting device to an object. The receiving unit includes an infrared photosensitive device disposed on the substrate and used to receive the infrared light reflected by the object.

13 Claims, 10 Drawing Sheets

(56) References Cited

U.S. PATENT DOCUMENTS

| | | | | |
|---|---|---|---|---|
| 9,846,473 | B1* | 12/2017 | Kalscheur | G01J 5/0875 |
| 9,864,116 | B2* | 1/2018 | Matsuyuki | G02B 5/207 |
| 10,334,184 | B2* | 6/2019 | Wang | H04N 5/268 |
| 10,388,026 | B1* | 8/2019 | Chao | G02B 27/0172 |
| 2004/0080011 | A1* | 4/2004 | Starikov | H01L 31/173 |
| | | | | 257/481 |
| 2008/0122803 | A1* | 5/2008 | Izadi | G06F 3/0421 |
| | | | | 345/175 |
| 2009/0058824 | A1* | 3/2009 | Nissar | G06F 3/0412 |
| | | | | 345/173 |
| 2010/0020209 | A1* | 1/2010 | Kim | H04N 3/155 |
| | | | | 348/294 |
| 2011/0037849 | A1* | 2/2011 | Niclass | G01S 17/89 |
| | | | | 348/135 |
| 2011/0096021 | A1* | 4/2011 | Kim | G02F 1/13338 |
| | | | | 345/174 |
| 2011/0148798 | A1* | 6/2011 | Dahl | G06F 3/011 |
| | | | | 345/173 |
| 2012/0243374 | A1* | 9/2012 | Dahl | G06F 3/043 |
| | | | | 367/93 |
| 2013/0048837 | A1* | 2/2013 | Pope | G01J 1/4204 |
| | | | | 250/214.1 |
| 2013/0155031 | A1* | 6/2013 | Dahl | G06F 3/017 |
| | | | | 345/177 |
| 2013/0176512 | A1* | 7/2013 | Posner | G02F 1/1333 |
| | | | | 349/33 |
| 2015/0002734 | A1* | 1/2015 | Lee | H04N 5/3532 |
| | | | | 348/367 |
| 2015/0077517 | A1* | 3/2015 | Powers | H04N 5/23241 |
| | | | | 348/46 |
| 2015/0083917 | A1* | 3/2015 | Wyrwas | G02B 26/02 |
| | | | | 250/341.1 |
| 2015/0303244 | A1* | 10/2015 | de Jong | H01L 27/3227 |
| | | | | 257/40 |
| 2016/0037070 | A1* | 2/2016 | Mandelli | H01L 27/14607 |
| | | | | 348/322 |
| 2016/0133762 | A1* | 5/2016 | Blasco Claret | H01L 27/14618 |
| | | | | 257/432 |
| 2016/0225812 | A1* | 8/2016 | Elkhatib | H01L 27/1463 |
| 2017/0176787 | A1* | 6/2017 | Jia | G02F 1/133308 |
| 2017/0177075 | A1* | 6/2017 | Zhang | G06T 7/20 |
| 2017/0195654 | A1* | 7/2017 | Powers | H04N 5/23241 |
| 2017/0195667 | A1* | 7/2017 | Chen | G02B 27/0172 |
| 2018/0129328 | A1* | 5/2018 | Park | H01L 27/3234 |
| 2018/0143073 | A1* | 5/2018 | Goldring | G01N 21/31 |
| 2018/0172510 | A1* | 6/2018 | Rosen | G01J 3/0256 |
| 2018/0184972 | A1* | 7/2018 | Carmi | G01J 3/0256 |
| 2018/0213206 | A1* | 7/2018 | Price | H04N 13/254 |
| 2019/0068853 | A1* | 2/2019 | Price | G02B 27/425 |
| 2019/0072770 | A1* | 3/2019 | Hall | G06T 7/507 |
| 2019/0072771 | A1* | 3/2019 | Hall | G01B 5/0014 |
| 2019/0098276 | A1* | 3/2019 | Duggan | H04N 13/296 |
| 2019/0114794 | A1* | 4/2019 | Wang | H04N 5/33 |

* cited by examiner

DISPLAY SUBSTRATE AND METHOD FOR MANUFACTURING THE SAME

CROSS-REFERENCE TO RELATED APPLICATIONS

This application claims priority to Chinese Patent Application 201711013369.6, filed Oct. 26, 2017, the entire contents of which are incorporated herein by reference.

TECHNICAL FIELD

The present disclosure relates to display technologies, and particularly to a display substrate and a method for manufacturing the display substrate.

BACKGROUND

With the development of 3D technologies, the application such stereoscopic display, machine vision, satellite remote sensing, etc., needs to obtain the depth information of scenes. The currently used technical solution is to use a depth camera to obtain the depth information of the target in the camera field of view.

At present, depth cameras mainly have three kinds of architectures, namely binocular stereo vision, time of flight (TOF) and structured light.

The binocular stereo vision uses the stereo vision of two lenses to measure the depth of the scene. The camera emits light waves to illuminate the three-dimensional scene, and the light waves are reflected by the three-dimensional scene and returned to the depth camera. The depth information of the three-dimensional scene is acquired according to a time difference (i.e., a phase difference) between the emission time of the light waves and the reception time of the reflected light waves.

The basic principle of structured light is to project a controllable spot, strip or surface structure from the structured light projector to the surface of the object to be measured, and obtain an image by an image sensor (such as a camera). By the system geometry, using the trigonometric principle, the three-dimensional coordinates of the object are calculated.

SUMMARY

According to a first aspect of arrangements of the present disclosure, there is provided a display substrate, including an active region and a non-active region. A depth camera is disposed in the non-active region. The depth camera includes at least one receiving unit and a plurality of diffractive units. At least a part of the diffractive units includes: an infrared light emitting device that emits infrared light and is disposed on the substrate; and a diffractive optical element that is disposed on the infrared light emitting device and is used to transmit the infrared light emitted from the infrared light emitting device to an object. The receiving unit includes an infrared photosensitive device that is disposed on the substrate and receives the infrared light reflected by the object.

According to a second aspect of arrangements of the present disclosure, there is provided a method for manufacturing a display substrate. The method includes forming a depth camera in a non-active region while forming a display element in an active region. Forming the depth camera includes: forming an infrared light emitting device on the substrate. The infrared light emitting device is used for emitting infrared light. The method includes forming a diffractive optical element on the infrared light emitting device. The diffractive optical element is used for transmitting the infrared light emitted from the infrared light emitting device to an object. The method includes forming an infrared photosensitive device on the substrate. The infrared photosensitive device is used for receives the infrared light reflected by the object.

According to a third aspect of arrangements of the present disclosure, there is provided a display panel including the depth camera device. Display units are further provided on the substrate, and the depth camera device is located around the display units.

According to a fourth aspect of arrangements of the present disclosure, there is provided a device, including the above depth camera device or the above display panel.

BRIEF DESCRIPTION OF THE DRAWINGS

Other features, objectives, and advantages of the present disclosure will become more apparent from the detailed description of the accompanying drawings.

DETAILED DESCRIPTION

The present application will be further described in detail below with reference to the accompanying drawings and arrangements. It should be understood that the specific arrangements described herein are merely illustrative of the present disclosure, but are intended to limit the present disclosure. It should also be noted that, for the convenience of description, only parts related to the present disclosure are shown in the drawings.

It should be noted that the arrangements in the present disclosure and the features in the arrangements may be combined with each other if the arrangements or features do not conflict with each other. The present disclosure will be described in detail below with reference to the accompanying drawings.

One reason why existing depth cameras are difficult to popularize is that they are often difficult to miniaturize due to their complicated optical devices and electronic devices, and are expensive and difficult to be accepted by ordinary consumers.

Figure 1:
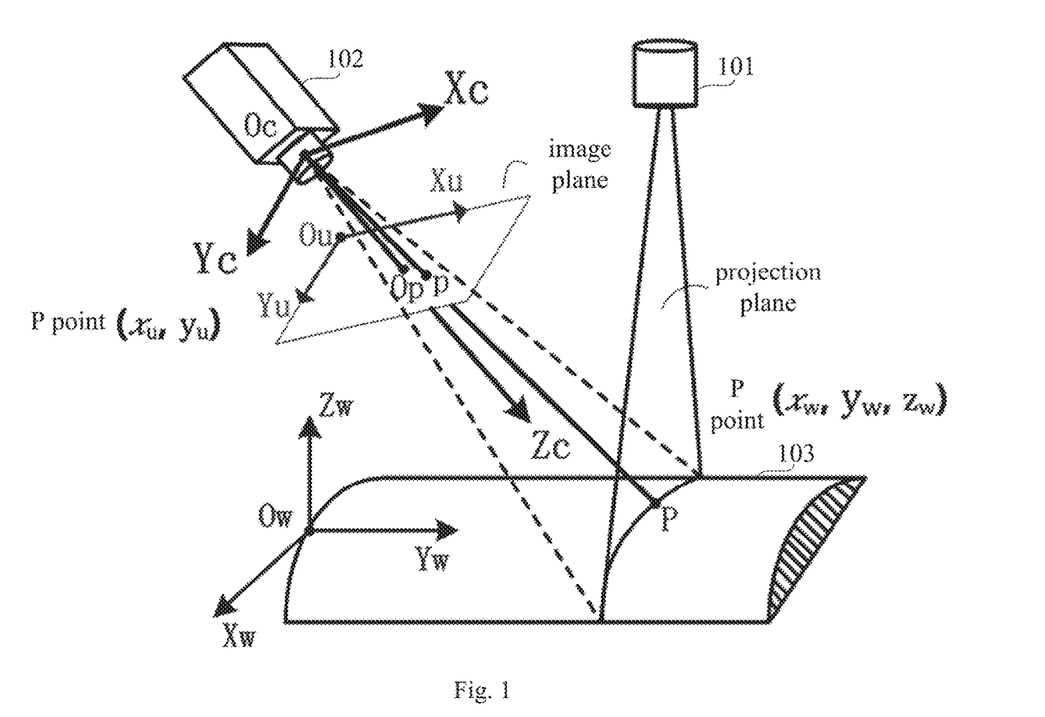
FIG. 1 is a schematic diagram of a conventional gesture recognition using a depth camera employing a structured light method.

FIG. 1 is a schematic diagram of a conventional gesture recognition using a depth camera employing a structured light method. As shown in FIG. 1, the depth camera requires two core components, one is a projection device 101 that projects structured light, and the other is a camera device 102 that receives structured light hitting the object 103 and then being reflected back. In this process, the projection device 101 projects a line structured light, but in practice various patterns such as stripes or scatter clouds may appear. The spatial coordinates of the object 103 are derived by calculating the deformation or displacement relative change of the encoded structured light information received by the camera device 102. The two core components typically appear in the form of two modular devices, while it is often difficult to achieve miniaturization, resulting in relatively high cost and inflexible use.

Figure 11:
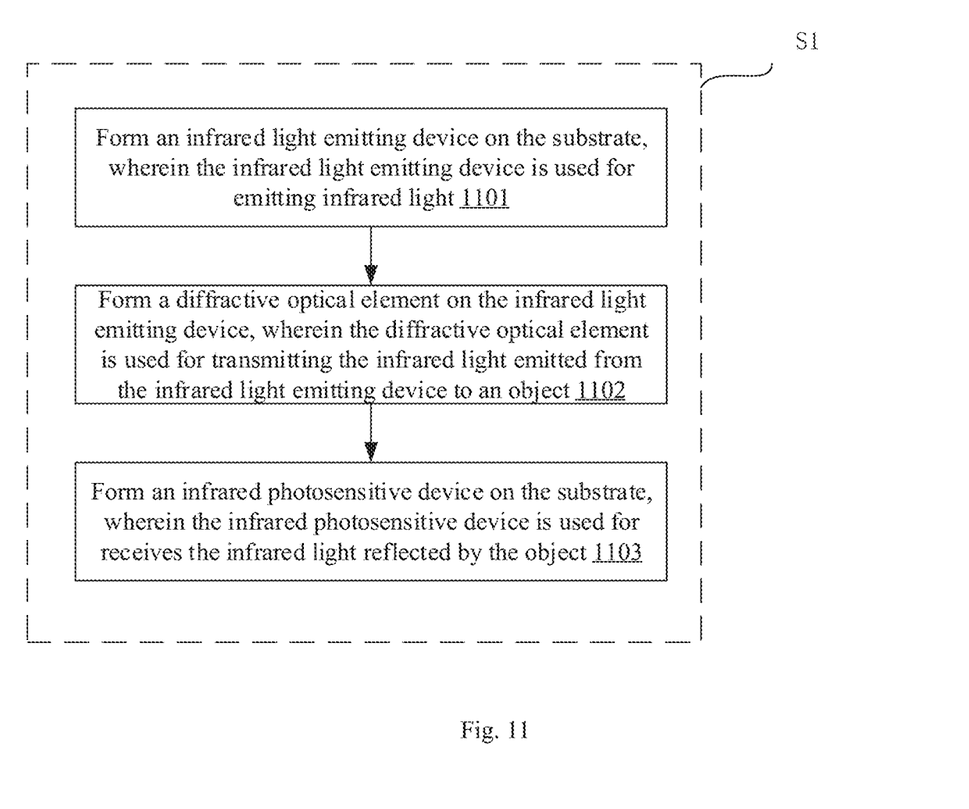
FIG. 11 is a flow chart of a method for manufacturing a depth camera device according to an arrangement of the present disclosure.

FIG. 11 is a flow chart of a method for manufacturing a depth camera device according to an arrangement of the present disclosure. The method may include the following blocks.

In S1, a depth camera is formed in a non-active region while forming a display element in an active region. The term "active region" used herein refers to a region on a substrate where display elements or light emitting elements are provided. The term "non-active region" used herein refers to a region on a substrate where no display elements or light emitting elements are provided. For example, the non-active region may refer to a periphery region of a substrate.

The forming the depth camera in S1 includes forming an infrared light emitting device on the substrate (1101). The infrared light emitting device is used for emitting infrared light.

The forming the depth camera in S1 includes forming a diffractive optical element on the infrared light emitting device (1102). The diffractive optical element is used for transmitting the infrared light emitted from the infrared light emitting device to an object.

The forming the depth camera in S1 includes forming an infrared photosensitive device on the substrate (1103). The infrared photosensitive device is used for receives the infrared light reflected by the object.

Figure 2:
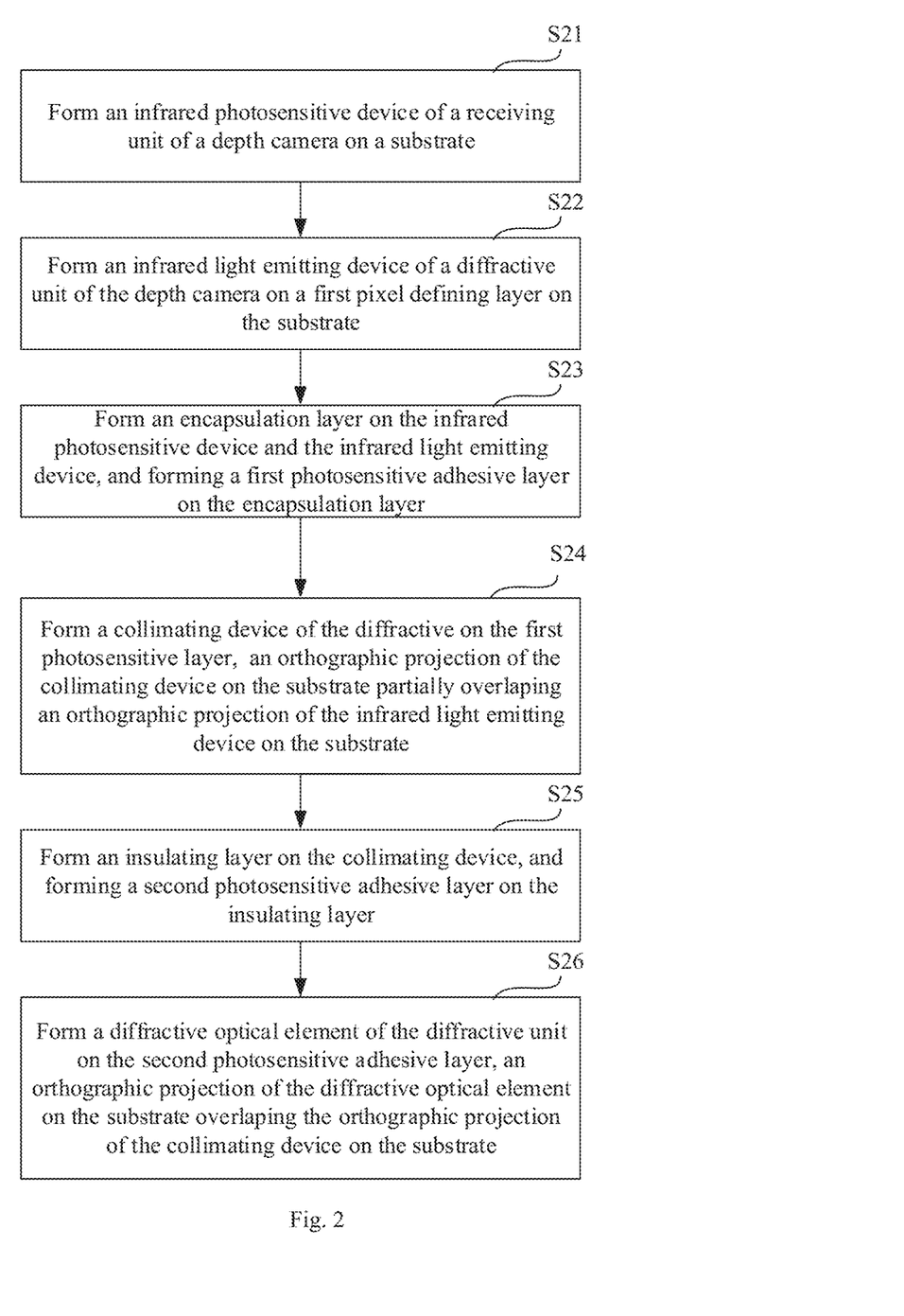
FIG. 2 is a flow chart of a method for manufacturing a depth imaging device according to an arrangement of the present disclosure.

FIG. 2 is a flow chart of a method for manufacturing a depth camera device according to an arrangement of the present disclosure.

As shown in FIG. 2, in the arrangement, a method for manufacturing a depth camera device includes the following blocks.

In S21, an infrared photosensitive device of a receiving unit of a depth camera is formed on a substrate.

In S22, an infrared light emitting device of a diffractive unit of the depth camera on a first pixel defining layer is formed on the substrate.

In S23, an encapsulation layer is formed on the infrared photosensitive device and the infrared light emitting device, and a first photosensitive adhesive layer is formed on the encapsulation layer.

In S24, a collimating device of the diffractive is formed on the first photosensitive layer. An orthographic projection of the collimating device on the substrate partially overlaps an orthographic projection of the infrared light emitting device on the substrate. The "orthographic projection" refers to a projection which is generated when the (parallel) projection lines are orthogonal to the projection plane (where an objected is projected to).

In S25, an insulating layer is formed on the collimating device, and a second photosensitive adhesive layer is formed on the insulating layer.

In S26, a diffractive optical element of the diffractive unit is formed on the second photosensitive adhesive layer. An orthographic projection of the diffractive optical element on the substrate overlaps the orthographic projection of the collimating device on the substrate. The first and second photosensitive adhesive layers herein may be for example a UV (Ultraviolet) adhesive layer.

Figure 3:
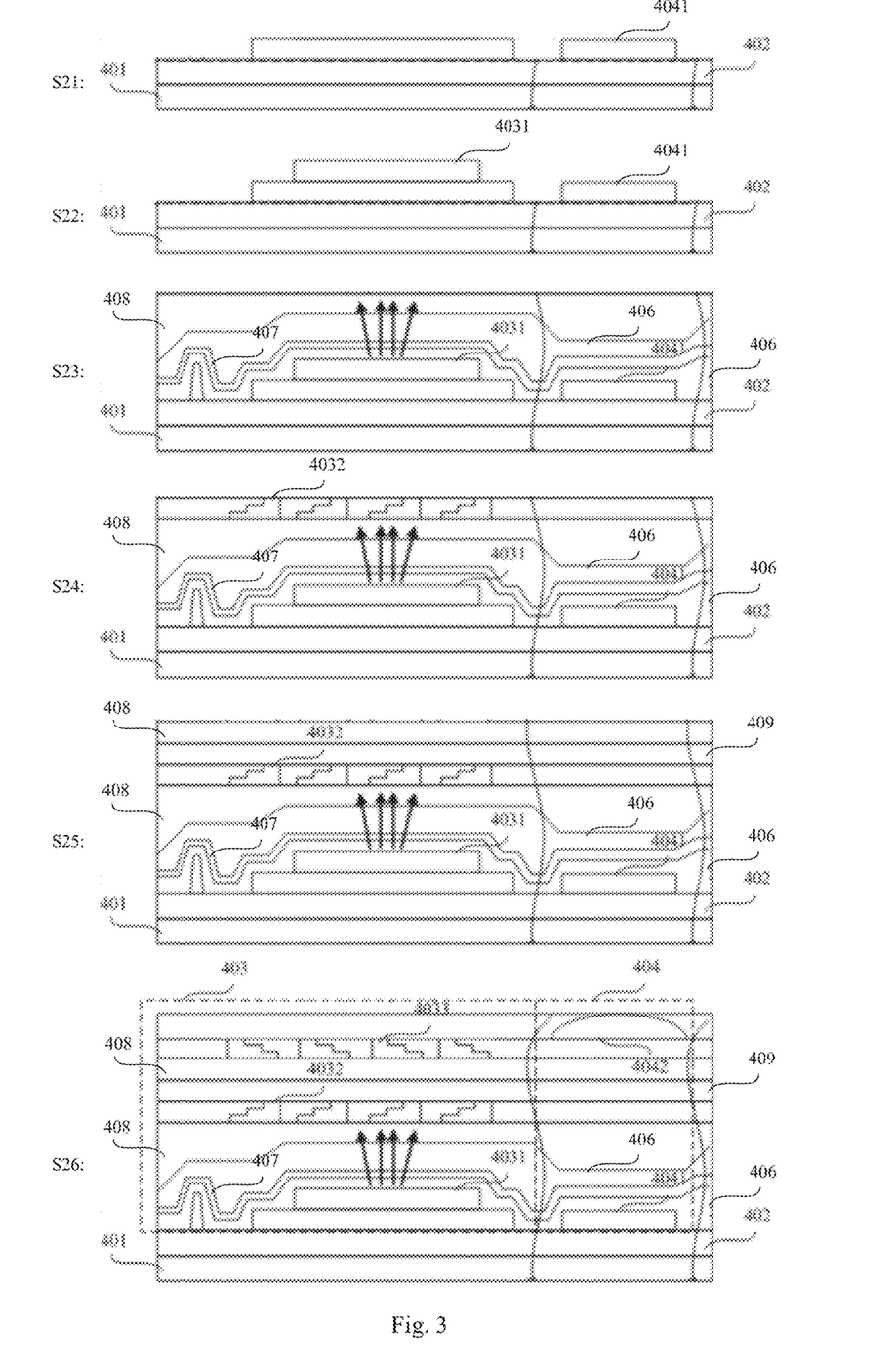
FIG. 3 is a cross-sectional view of a device during each of the manufacturing processes that respectively correspond to the method of FIG. 2.

FIG. 3 is a cross-sectional view of a device during each of the manufacturing processes that respectively correspond to the method of FIG. 2.

As shown in FIGS. 2 and 3, in S21, after an array substrate 402 is manufactured, an infrared photosensitive device 4041 of a receiving unit is fabricated on the substrate 402. In this arrangement, the infrared photosensitive device is for example configured as an organic photodiode (OPD) capable of simultaneously detecting infrared light and visible light. In other arrangements, the infrared photosensitive device may be a different infrared sensor as long as the size of the infrared sensor does not affect the integration of the display panel, and the same technical effect can be achieved.

In S22, an infrared light emitting device 4031 of a diffractive unit is formed in a first pixel defining layer on the substrate 402. Specifically, one or more first pixel defining layers may be disposed on the substrate 402. In this arrangement, the infrared light emitting device is for example configured as an infrared electroluminescent device (infrared EL). In other arrangements, the infrared light emitting device may also be a different infrared light emitting device, as long as the size of the infrared light emitting device does not affect the integration of the display panel, that is as long as that the same technical effects can be achieved. In addition, according to different process equipment and different process flows, the evaporation process and the fabrication of the infrared light emitting device can be performed step by step. It should be noted that the FIG. 3 only shows a schematic diagram of the manufacturing processes, and in practical processes, the infrared light emitting device 4031 may be formed in the first pixel defining layer, that is, the first pixel defining layer may be embedded in the first pixel defining layer rather than over the first pixel defining layer.

In S23, an encapsulation layer is formed on the infrared photosensitive device 4041 and the infrared light emitting device 4031, and a first photosensitive adhesive layer 408 is formed on the encapsulation layer. Specifically, in this arrangement, the encapsulation layer includes two water blocking layers and a planarization layer between the two water blocking layers. S23 includes: forming a first water blocking on the infrared photosensitive device 4041 and the infrared light emitting device 4031; forming a planarization layer 407 on the first water blocking layer; forming a second water blocking layer 406 on the flat layer (or planarization layer) 407, and forming a first photosensitive adhesive layer 408 on the second water blocking layer 406. In a further arrangement, the encapsulation layer can also be configured as other encapsulation layer structures as commonly used in this art according to actual needs, corresponding manufacturing processes can be used in S23 to achieve the same technical effects.

In S24, a collimating device 4032 of a diffractive unit is formed on the first photosensitive adhesive layer 408. An orthographic projection of the collimating device 4032 on the substrate 402 partially overlaps an orthographic projection of the infrared light emitting device 4031 on the substrate 402.

Specifically, in the arrangement, the surface of the collimating device 4032 fabricated in S23 is a diffractive structure having a phase wave band (or phase zone). A cross section of the collimating device 4032 in a direction perpendicular to the substrate 402 has a plurality of ladder shapes (that is the cross section is like a staircase), and the height of the steps (or stairs) are in μm order. A cross section of the collimating device 4032 in a direction parallel with the substrate 402 is an irregular shape. The collimating device 4032 is made of a light-shielding metal material, and for example, any one of molybdenum (Mo), titanium (Ti), aluminum (Al), silver (Ag), and indium tin oxide (ITO) may be used.

In S25, after the fabrication of the collimating device 4032 is completed, an insulating layer 409 is formed on the collimating device, and a second photosensitive adhesive layer 408 is formed on the insulating layer 409. In other arrangements, different materials and components can be disposed between the collimating device and the diffractive optical element according to different processes configuration, and the same technical effects can be achieved.

In S26, a diffractive optical element 4033 of a diffractive unit is formed on the second photosensitive adhesive layer 408. An orthographic projection of the diffractive optical element 4033 on the substrate 402 overlaps the orthographic projection of the collimating device 4032 on the substrate 402.

Specifically, in the present arrangement, the surface of the diffractive optical element 4033 has a phase distribution corresponding to the phase wave band. A cross section of the diffractive optical element 4033 in a direction perpendicular to the substrate 402 has a plurality of ladder shapes, and a cross section of the diffractive optical element 4033 in a direction parallel with the substrate 402 is an irregular shape.

In the present arrangement, the collimating device and the DOE having specific shapes and corresponding diffractive structures are manufactured in S24 and S26. Thus, the optical device is miniaturized to be integrated into the display panel, and the thickness of the display panel can be reduced. In other arrangements, collimating devices and DOEs having different shapes can also be fabricated by configuring different optical design models, such as designing a longitudinal profile (or cross section) into an irregular shape, etc., as long as the optical device can be miniaturized for integration into the display panel and the same technical effects can be achieved.

The above arrangement realizes the deep information acquisition by lowering the cost by integrating the miniaturized depth camera on the substrate; and further realizes the optical by configuring the collimating device and the DOE having a specific shape and a corresponding diffraction structure. The device is miniaturized to be integrated in the display panel, reducing the thickness of the display panel.

Figure 4:
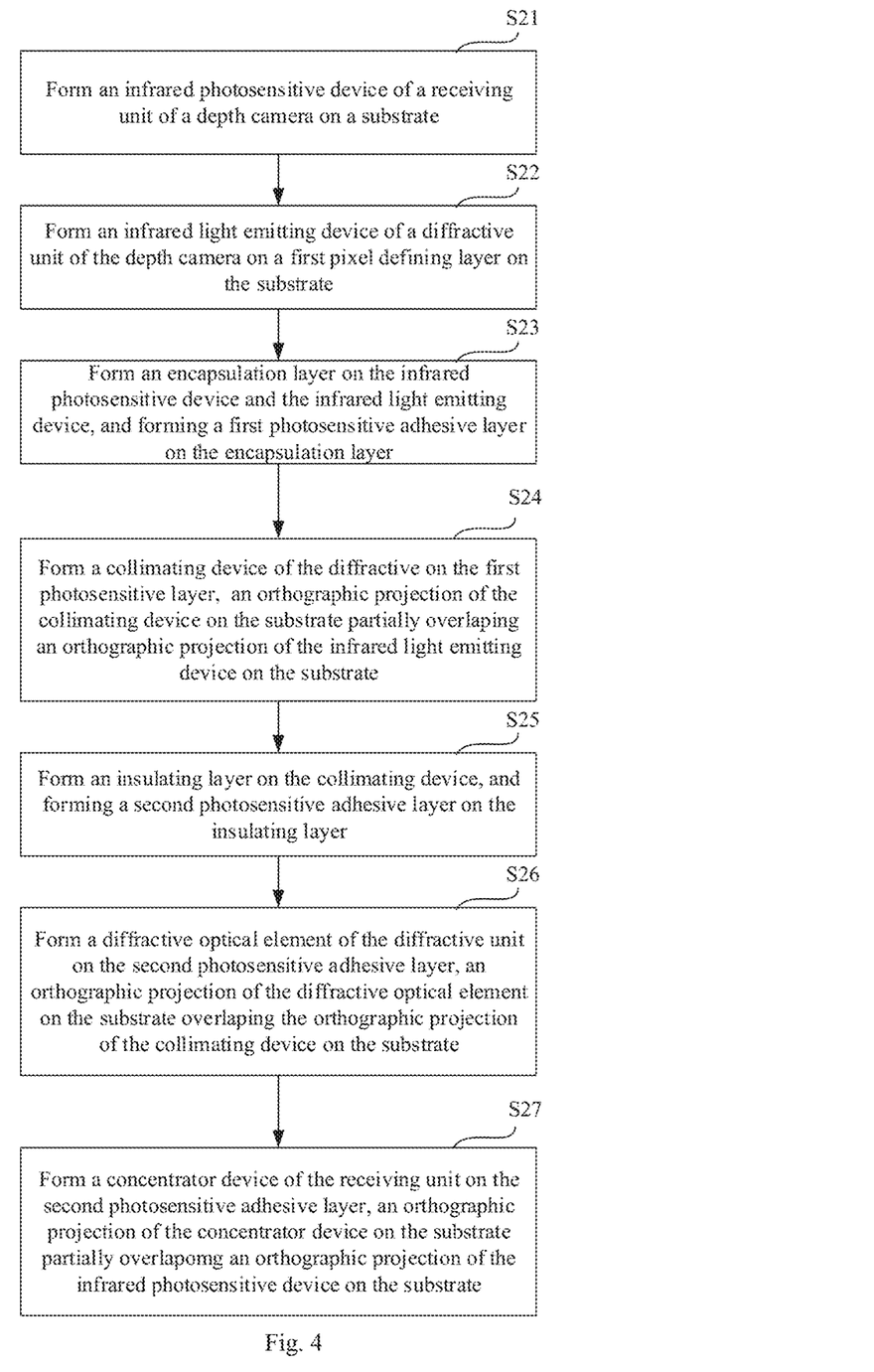
FIG. 4 is a flow chart of an exemplary arrangement of the method shown in FIG. 2.

FIG. 4 is a flow chart of an exemplary arrangement of the method as shown in FIG. 2. As shown in FIG. 4, in an exemplary arrangement, the foregoing method further includes the following blocks.

In S27, a concentrator device of the receiving unit is formed on the second photosensitive adhesive layer. An orthographic projection of the concentrator device on the substrate partially overlaps an orthographic projection of the infrared photosensitive device on the substrate.

Specifically, in the present arrangement, the concentrator device here is used for enabling light to be concentrated or focused. For example, the concentrator device may be a prism film. In other arrangements, the concentrator device can be configured as a different concentrator device, for example, a different type of concentrator film, or a convex lens.

In order to ensure the light concentrating effect, a third photosensitive adhesive layer may be formed on the second photosensitive adhesive layer, and a concentrator device may be formed on the third photosensitive adhesive layer. An orthographic projection of the third photosensitive adhesive layer on the substrate overlaps an orthographic projection of the concentrator device on the substrate.

The present disclosure also provides a display panel manufacturing method, which differs from the above-described methods of manufacturing a depth camera device only in that a display unit is manufactured while a depth camera is manufactured on a substrate. By this method, the manufacturing costs can be further reduced.

Specifically, the display panel manufacturing method further includes: forming a light emitting device of a display unit on a second pixel defining layer on the substrate while forming the infrared light emitting device. Individual ones of the first pixel defining layers are disposed around the second pixel defining layer(s).

In the present arrangement, the light emitting device is for example configured as an electroluminescent device (EL), and in other arrangements, it can also be configured as a different light emitting device.

In the arrangement, the first water blocking layer, the planarization layer, the second water blocking layer and the first photosensitive adhesive layer are sequentially formed on the infrared light emitting device, the infrared photosensitive device and the light emitting device in 23. In other arrangements, different materials and components can be disposed between the infrared light emitting device and the collimating device according to different processes configuration, and the same technical effects can be achieved.

Figure 5:
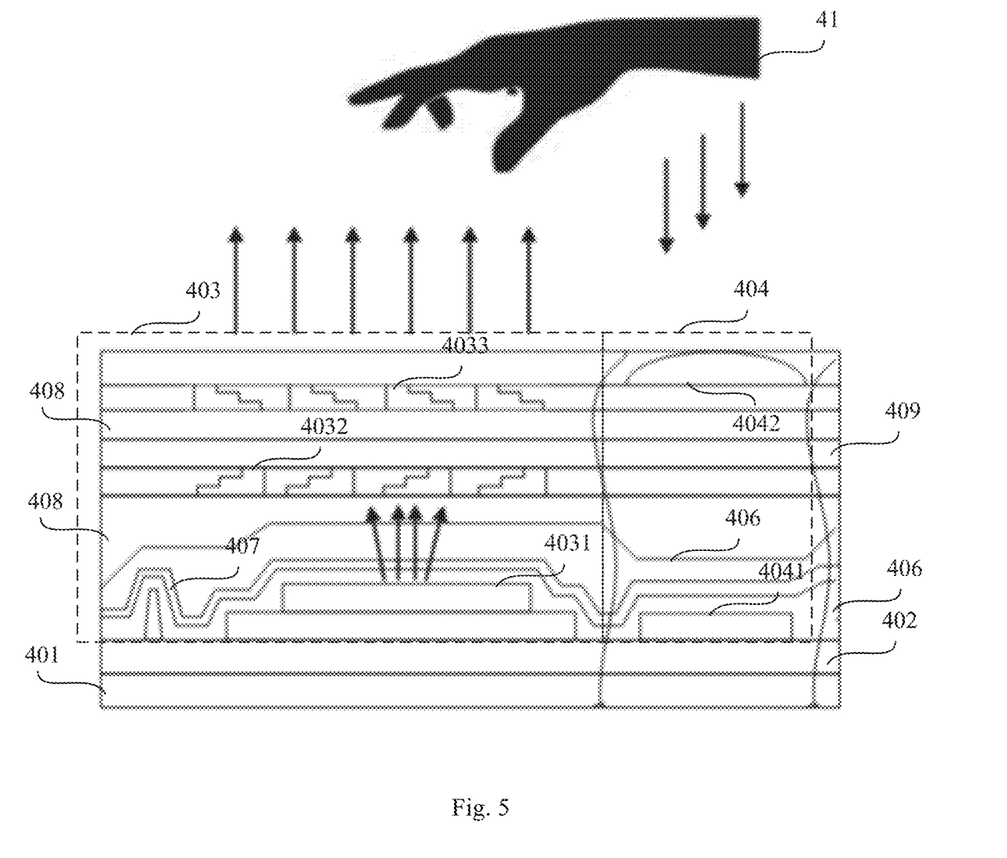
FIG. 5 is a schematic structural diagram of a depth camera device according to an arrangement of the present disclosure.

FIG. 5 is a schematic structural diagram of a depth camera device according to an arrangement of the present disclosure. The depth camera device shown in FIG. 5 can be manufactured by the depth camera device manufacturing method provided by any of the above arrangements.

As shown in FIG. 5, in the present arrangement, a depth camera device is provided. A depth camera is disposed on a substrate 402 of the depth camera device. The depth camera includes a receiving unit 404 and a plurality of diffractive units 403.

The receiving unit 404 includes an infrared photosensitive device 4041 located on the substrate 402.

At least a part of the diffraction units 403 include the infrared light emitting device 4031, the collimating device 4032 and the diffractive optical element 4033.

The infrared light emitting device 4031 is disposed on the first pixel defining layer on the substrate.

The collimating device 4032 is disposed on the first photosensitive adhesive layer 408. The first photosensitive adhesive layer 408 is on the encapsulation layer, the encapsulation layer is on the infrared photosensitive device 4041 and the infrared light emitting device 4031, and an orthographic projection of the collimating device 4032 on the substrate 402 partially overlaps an orthographic projection of the infrared light emitting device 4031 on the substrate.

The diffractive optical element 4033 is on the second photosensitive adhesive layer 408. The second photosensitive adhesive layer 408 is on the insulating layer 409, the insulating layer 409 is on the collimating device 4032, and an orthographic projection of the diffractive optical element 4033 on the substrate 402 overlaps the orthographic projection of the collimating device 4032 on the substrate 402.

Specifically, in the arrangement, the infrared photosensitive device 4041 is an organic photodiode (OPD) capable of simultaneously detecting infrared light and visible light, and the infrared light emitting device 4031 is an infrared electroluminescent device (infrared EL). In other arrangements, the infrared photosensitive device 4041 can be configured as different devices according to actual needs, as long as the same function can be achieved without affecting the integration of the display panel, that is, as long as the same technical effect can be achieved.

Taking gesture recognition as an example, the infrared light emitted by the infrared light emitting device 4031 forms parallel light through the collimating device 4032, and then passes through the diffractive optical element 4033 to form a cloud pattern of scattered spots, which shows the diffraction. When the hand 41 appears in the diffraction space above the screen, a scattered spot pattern is generated on the hand 41, and the infrared photosensor 4041 of the receiving unit 404 collects the scattered spot pattern by receiving infrared light and then the processor can decode the light and finally recognize the 3D gesture. In addition to gesture recognition, the display panel provided by this arrangement can also be applied to other different types of depth information collection and application.

In an exemplary arrangement, the receiving unit further includes a concentrator device on the second photosensitive adhesive layer. An orthographic projection of the concentrator device on the substrate partially overlaps an orthographic projection of the infrared photosensitive device on the substrate.

Similar to FIG. 5, in order to ensure the light concentrating effect, a third photosensitive adhesive layer may be formed on the second photosensitive adhesive layer 408, and a concentrator device 4042 may be formed on the third photosensitive adhesive layer. An orthographic projection of the third photosensitive adhesive layer on the substrate 402 overlaps an orthographic projection of the concentrator device 4042 on the substrate 402.

Specifically, in the present arrangement, the concentrator device is a prism film. In other arrangements, the concentrator device can be configured as a different concentrator device, for example, a different type of concentrator film, or a convex lens.

Figure 6:
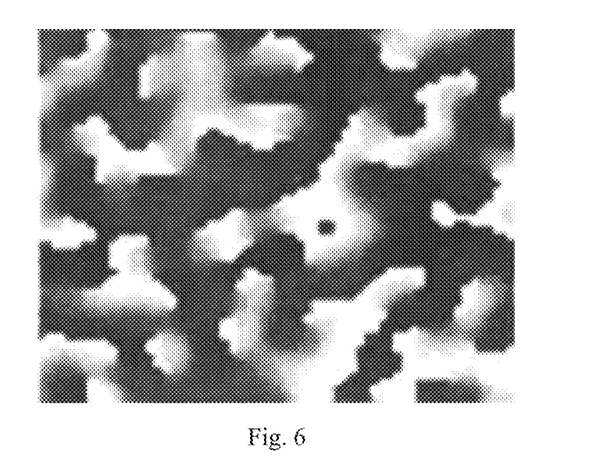
FIG. 6 is a top view of a collimating device according to an exemplary arrangement of the present disclosure.
Figure 7:
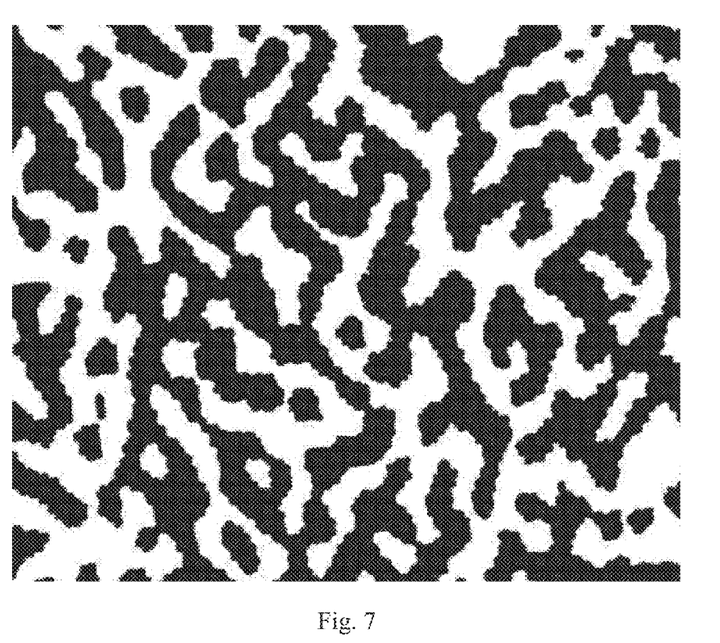
FIG. 7 is a top view of a DOE according to an exemplary arrangement of the present disclosure.

FIG. 6 is a top view of a collimating device according to an exemplary arrangement of the present disclosure. FIG. 7 is a top view of a DOE according to an exemplary arrangement of the present disclosure.

As shown in FIGS. 5 to 7, in an exemplary arrangement, the surface of the collimating device 4032 is a diffractive structure having a phase wave band. A cross section of the collimating device 4032 in a direction perpendicular to the substrate 402 has a plurality of ladder shapes, and a cross section of the collimating device 4032 in a direction parallel with the substrate 402 is an irregular shape.

The diffractive optical element 4033 has a surface which has a phase distribution corresponding to the phase wave band. A cross section of the diffractive optical element 4033 in a direction perpendicular to the substrate 402 has a plurality of ladder shapes, and a cross section of the diffractive optical element 4033 in a direction parallel with the substrate 402 is an irregular shape.

In other arrangements, the collimating device may be a micro-lens array. Other types of collimating devices can be employed as long as the devices can be manufactured in nm scale.

Figure 8:
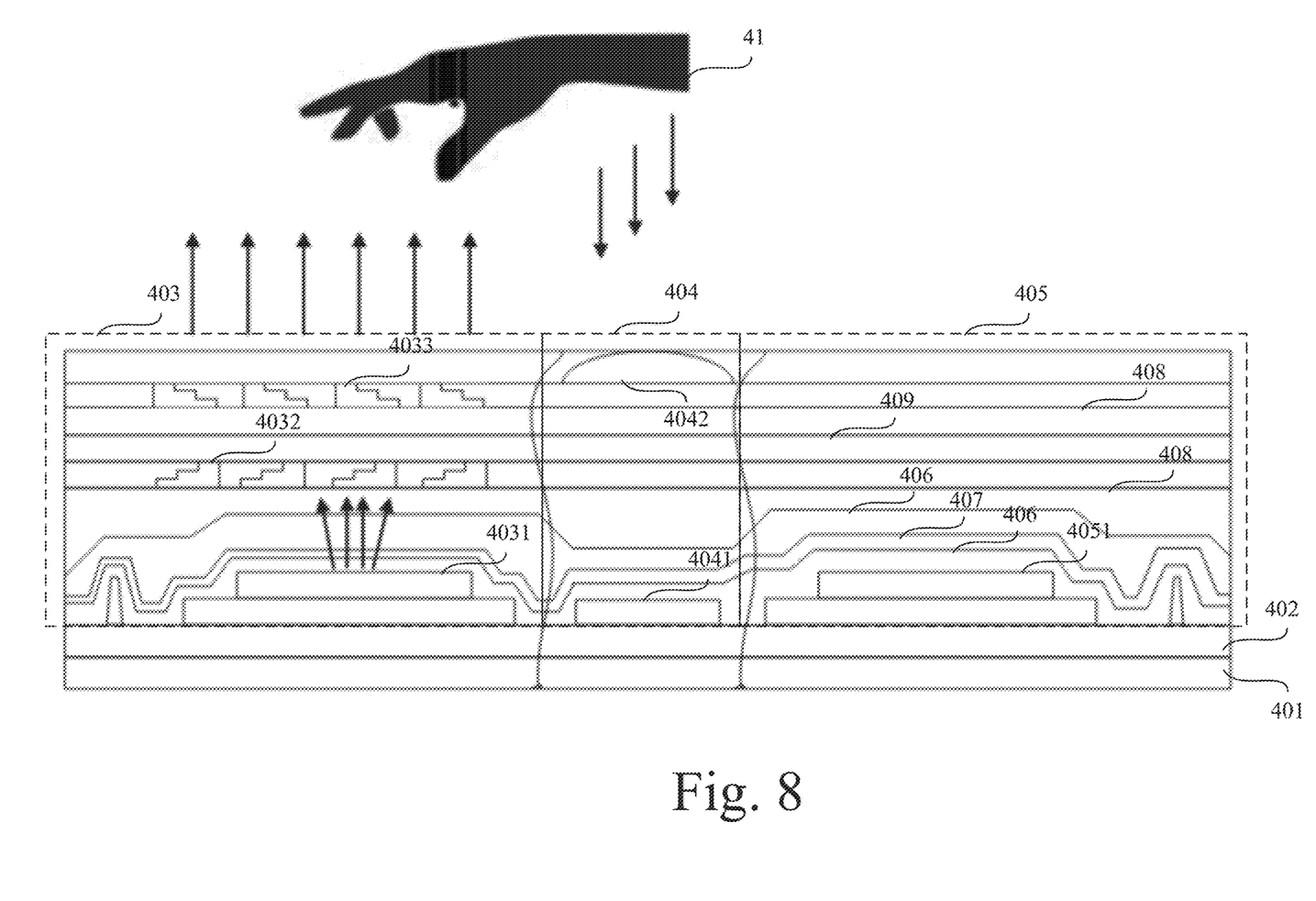
FIG. 8 is a schematic structural diagram of a display panel according to an arrangement of the present disclosure.

FIG. 8 is a schematic structural diagram of a display panel according to an arrangement of the present disclosure.

As shown in FIG. 8, the present disclosure further provides a display panel. The difference between the display panel and the previously described depth camera device resides in that the substrate 402 is further provided with a display unit 405.

Specifically, a plurality of first pixel defining layers (PDLs) are disposed on the substrate 402 in a region of the diffractive units 403, and a plurality of second pixel defining layers are disposed on the substrate 402 in a region of the light emitting unit(s) 405. The infrared light emitting device 4031 of the diffractive units 403 and the light emitting devices 4051 of the units 405 are disposed on the first pixel defining layer and the second pixel defining layer, respectively.

Figure 9:
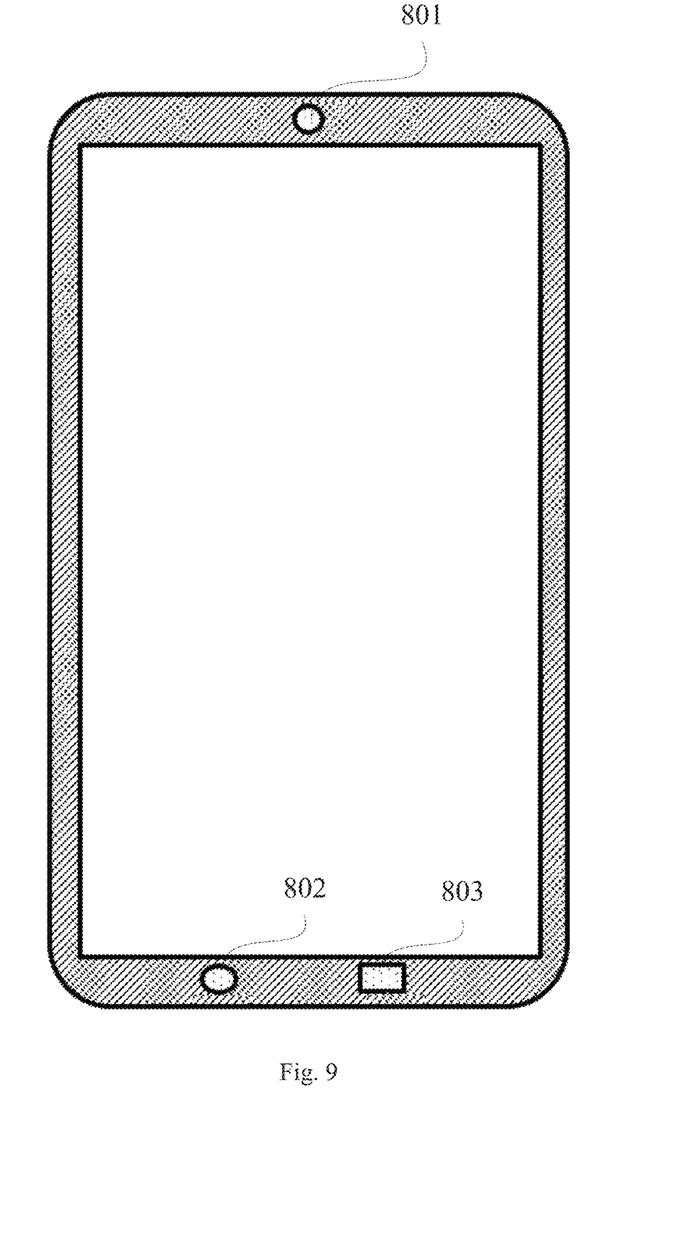
FIG. 9 is a schematic structural diagram of a display panel according to an exemplary arrangement of the present disclosure.
Figure 10:
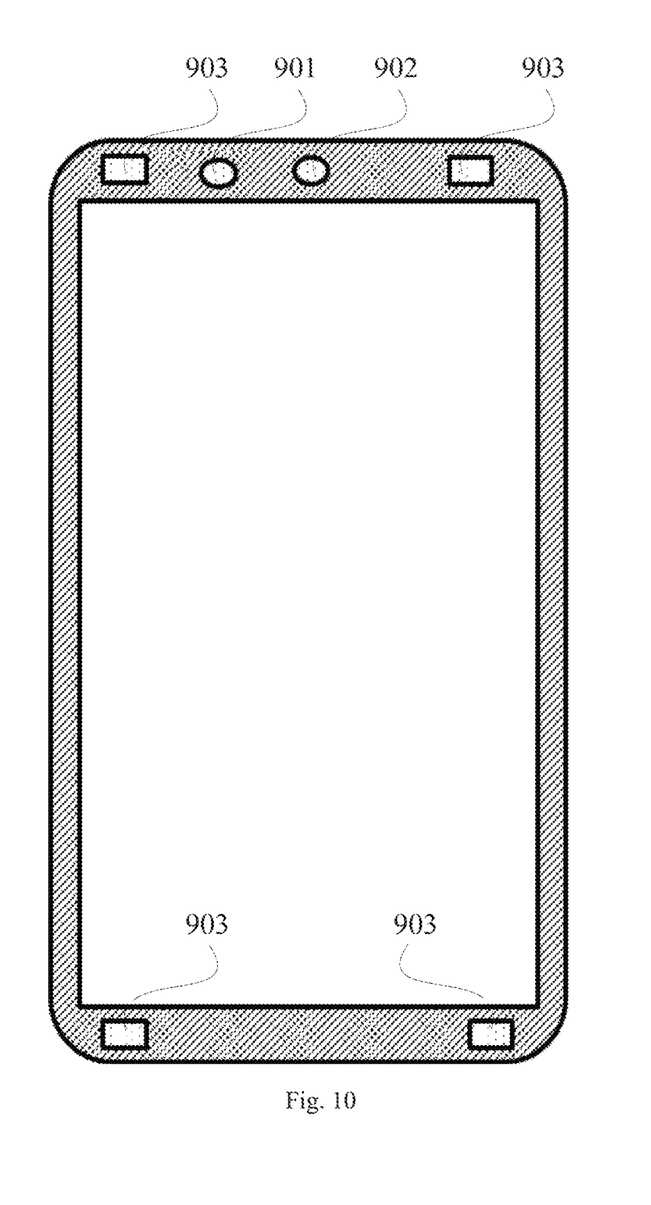
FIG. 10 is a schematic structural view of a display panel according to an exemplary arrangement of the present disclosure.

FIG. 9 is a schematic structural diagram of a display panel according to an exemplary arrangement of the present disclosure. FIG. 10 is a schematic structural view of a display panel according to an exemplary arrangement of the present disclosure.

As shown in FIG. 9, in some arrangements, a single diffractive unit 803 is disposed in the display panel. Since the diffraction space of the single diffractive unit is an inverted trapezoid, the collection of depth information may have a blind area, which affects the user experience. Therefore, in other arrangements, as shown in FIG. 10, multiple diffractive units may be arranged in the display panel to address this issue.

The above arrangement further reduces the blind area in collection of the depth information by arranging a plurality of diffractive units in the depth camera.

However, the arrangement of the plurality of diffractive units brings about a new problem that the diffraction spaces of the diffractive units overlap, which may cause interference to the image acquisition (or collection) of the receiving unit.

Therefore, in an exemplary arrangement, the depth camera is configured to perform collection in the spaces diffracted by individual diffractive units one by one in a time division multiplexing manner to solve problem of the interference to the image acquisition (or collection) of the receiving unit caused by overlapped diffractive spaces.

The above arrangement perform collection in the space diffracted by each diffractive unit one by one in a time division multiplexing manner, thus avoiding interference caused by simultaneously collecting the overlapped spaces.

The present disclosure also provides a device includes the depth camera device or the display panel provided by any of the above arrangements. The device can be any product or component that needs to have a depth camera integrated, such as an electronic paper, a mobile phone, a tablet, a television, a display, a notebook computer, a digital photo frame, a navigator, etc.

The flowcharts and block diagrams in the drawings illustrate the architecture, functionality, and operation of possible implementations of systems, methods, and computer program products in accordance with various arrangements of the present disclosure. In this regard, each block of the flowchart or block diagram can represent a module, a program segment, or a portion of code, the module, the program segment, or the portion of the code includes one or more executable instructions for implementing specified logic functions. It should also be noted that in some alternative implementations, the functions noted in the blocks may also occur in a different order than the one illustrated in the drawings. For example, two blocks shown in succession may in fact be executed substantially in parallel, and they may sometimes be executed in a reverse order, depending upon the functionalities involved. It should be noted that each block of the block diagrams and/or flowcharts, and combinations of blocks in the block diagrams and/or flowcharts, can be implemented by a dedicated hardware-based system that performs specified functions or operations, or can be implemented by a combination of dedicated hardware and computer instructions.

The units or modules described in the arrangements of the present disclosure may be implemented by software or by hardware. The described units or modules may also be provided in a processor. For example, each of the units may be a software program disposed in a computer or a mobile smart device, or may be a separately configured hardware device. The names of these units or modules do not in any way constitute a limitation on the unit or module itself.

The above description only shows exemplary arrangements and is intended to explain the technical principles of the present disclosure. It should be understood by those skilled in the art that the scope of the present disclosure is not limited to the specific combinations of the above technical features, and should also cover other technical solutions which are formed by arbitrarily combining the technical features or equivalent features without departing from the spirit of the present disclosure. For example, the present disclosure is intended to cover technical solutions that are formed by replacing the technical features as described in the present disclosure with other technical features (which may be disclosed by the present disclosure, but are not limited thereto) having the similar functions.

What is claimed is:

1. A display substrate, comprising an active region and a non-active region, wherein a depth camera is disposed in the non-active region;
   wherein:
   the depth camera comprises at least one receiving unit and a plurality of diffractive units;
   at least a part of the diffractive units comprise:
     an infrared light emitting device that emits infrared light and is disposed on the substrate; and
     a diffractive optical element that is disposed on the infrared light emitting device and is used to transmit the infrared light emitted from the infrared light emitting device to an object;
   the receiving unit comprises an infrared photosensitive device that is disposed on the substrate and receives the infrared light reflected by the object;
   the display substrate further comprising:
     a collimating device that is disposed on a side of the infrared light emitting device away from the substrate;
     an encapsulation layer disposed on the infrared photosensitive device and the infrared light emitting device; and
     a first photosensitive adhesive layer disposed on the encapsulation layer, wherein an orthographic projection of the collimating device on the substrate partially overlaps an orthographic projection of the infrared light emitting device on the substrate.

2. The display substrate according to claim 1, further comprising:
   a second photosensitive adhesive layer disposed below the diffractive optical element;
   an insulating layer disposed below the second photosensitive adhesive layer and above the collimating device;
   wherein an orthographic projection of the collimating device on the substrate overlaps an orthographic projection of the diffractive optical element on the substrate.

3. The display substrate according to claim 2, wherein the receiving unit further comprises:
   a concentrator device disposed on the second photosensitive adhesive layer, wherein an orthographic projection of the concentrator device on the substrate partially overlaps an orthographic projection of the infrared photosensitive device on the substrate.

4. The display substrate according to claim 1, wherein the collimating device is a micro-lens array.

5. The display substrate according to claim 1, wherein the collimating device has a surface which is a diffractive structure having a phase wave band, a cross section of the collimating device in a direction perpendicular to the substrate being a plurality of ladder shapes, and a cross section of the collimating device in a direction parallel with the substrate being an irregular shape;
   the diffractive optical element has a surface which has a phase distribution corresponding to the phase wave band, a cross section of the diffractive optical element in a direction perpendicular to the substrate being a plurality of ladder shapes, and a cross section of the diffractive optical element in a direction parallel with the substrate being an irregular shape.

6. The display substrate according to claim 1, wherein the at least one receiving unit and the plurality of diffractive units are formed in the same processes as that for manufacturing a display element in the active region.

7. A method for manufacturing a display substrate, comprising:
   forming a depth camera in a non-active region while forming a display element in an active region;
   wherein forming the depth camera comprises:
     forming an infrared light emitting device on the substrate, wherein the infrared light emitting device is used for emitting infrared light;
     forming a diffractive optical element on the infrared light emitting device, wherein the diffractive optical element is used for transmitting the infrared light emitted from the infrared light emitting device to an object;
     forming an infrared photosensitive device on the substrate, wherein the infrared photosensitive device is used for receives the infrared light reflected by the object;
     forming a collimating device on a side of the infrared light emitting device away from the substrate;
     forming an encapsulation layer on the infrared photosensitive device and the infrared light emitting device; and
     forming a first photosensitive adhesive layer disposed on the encapsulation layer, wherein an orthographic projection of the collimating device on the substrate partially overlaps an orthographic projection of the infrared light emitting device on the substrate.

8. The method according to claim 7, further comprising:
   forming a second photosensitive adhesive layer below the diffractive optical element; and
   forming an insulating layer below the second photosensitive adhesive layer and above the collimating device;

wherein an orthographic projection of the collimating device on the substrate overlaps an orthographic projection of the diffractive optical element on the substrate.

9. The method according to claim 8, further comprising:
forming a concentrator device on the second photosensitive adhesive layer, wherein an orthographic projection of the concentrator device on the substrate partially overlaps an orthographic projection of the infrared photosensitive device on the substrate.

10. The method according to claim 8, wherein forming the insulating layer comprises:
forming a first water blocking layer on the collimating device;
forming a planarization layer on the first water blocking layer;
forming a second water blocking layer on the planarization layer; and
forming the second photosensitive adhesive layer on the second water blocking layer.

11. The method according to claim 7, wherein the collimating device has a surface which is a diffractive structure having a phase wave band, a cross section of the collimating device in a direction perpendicular to the substrate being a plurality of ladder shapes, and a cross section of the collimating device in a direction parallel with the substrate being an irregular shape;
the diffractive optical element has a surface which has a phase distribution corresponding to the phase wave band, a cross section of the diffractive optical element in a direction perpendicular to the substrate being a plurality of ladder shapes, and a cross section of the diffractive optical element in a direction parallel with the substrate being an irregular shape.

12. The method according to claim 7, further comprising:
forming a third photosensitive adhesive layer on the second photosensitive adhesive layer, and forming a concentrator device on the third photosensitive adhesive layer, wherein an orthographic projection of the third photosensitive adhesive layer on the substrate overlaps an orthographic projection of the concentrator device on the substrate.

13. The method according to claim 12, wherein the concentrator device is a prism film or a convex lens.

* * * * *